United States Patent
Schreyer et al.

(10) Patent No.: US 9,682,507 B2
(45) Date of Patent: Jun. 20, 2017

(54) INJECTION MOLDING FLOW CONTROL APPARATUS AND METHOD

(71) Applicant: Synventive Molding Solutions, Inc., Peabody, MA (US)

(72) Inventors: Hans-Jorg Schreyer, Mommenheim (DE); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 344 days.

(21) Appl. No.: 14/625,845

(22) Filed: Feb. 19, 2015

(65) Prior Publication Data

US 2015/0158227 A1   Jun. 11, 2015

Related U.S. Application Data

(63) Continuation of application No. PCT/US2013/056133, filed on Aug. 22, 2013, and a
(Continued)

(51) Int. Cl.
   *B29C 45/76*   (2006.01)
   *B29C 45/00*   (2006.01)
   *B29C 45/28*   (2006.01)

(52) U.S. Cl.
   CPC ...... *B29C 45/7613* (2013.01); *B29C 45/0046* (2013.01); *B29C 45/76* (2013.01); *B29C 45/281* (2013.01); *B29C 2045/0032* (2013.01); *B29C 2045/2817* (2013.01); *B29C 2045/2827* (2013.01); *B29C 2045/2848* (2013.01); *B29C 2045/2865* (2013.01); *B29C 2045/2872* (2013.01); *B29C 2945/76076* (2013.01); *B29C 2945/76277* (2013.01);
(Continued)

(58) Field of Classification Search
   CPC .......... B29C 45/281; B29C 2045/2865; B29C 2045/2872
   See application file for complete search history.

(56) References Cited

U.S. PATENT DOCUMENTS 5,556,582 A * 9/1996 Kazmer .............. B29C 45/0025
                                                            264/328.12
6,464,909 B1 * 10/2002 Kazmer .............. B29C 45/2806
                                                            264/328.8
(Continued)

FOREIGN PATENT DOCUMENTS

JP        06064002 A  *  3/1994  ............. B29C 45/28

*Primary Examiner* — James Sanders
(74) *Attorney, Agent, or Firm* — Polsinelli PC

(57) ABSTRACT

An apparatus for controlling the rate of flow of fluid mold material from an injection molding machine to a mold cavity, the apparatus comprising:
  a manifold having a delivery channel that delivers fluid material to a first gate;
  an actuator interconnected to a valve pin having a tip end drivable along a drive path,
  the actuator and the valve pin being translationally driven at a controllable rate of travel by a valve system comprised of a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position and a second position.

19 Claims, 13 Drawing Sheets

Related U.S. Application Data continuation-in-part of application No. 13/484,336, filed on May 31, 2012, now Pat. No. 9,011,736, and a continuation-in-part of application No. 13/484,408, filed on May 31, 2012, now Pat. No. 9,005,509.

(60) Provisional application No. 61/692,957, filed on Aug. 24, 2012.

(52) U.S. Cl.
CPC ............... *B29C 2945/76381* (2013.01); *B29C 2945/76545* (2013.01); *B29C 2945/76598* (2013.01); *B29C 2945/76755* (2013.01); *B29C 2945/76765* (2013.01); *B29C 2945/76859* (2013.01)

(56) References Cited

U.S. PATENT DOCUMENTS

| | | | |
|---|---|---|---|
| 7,029,268 B2* | 4/2006 | Doyle | B29C 45/27 425/562 |
| 2010/0225025 A1* | 9/2010 | Striegel | B29C 45/0025 264/328.8 |

* cited by examiner

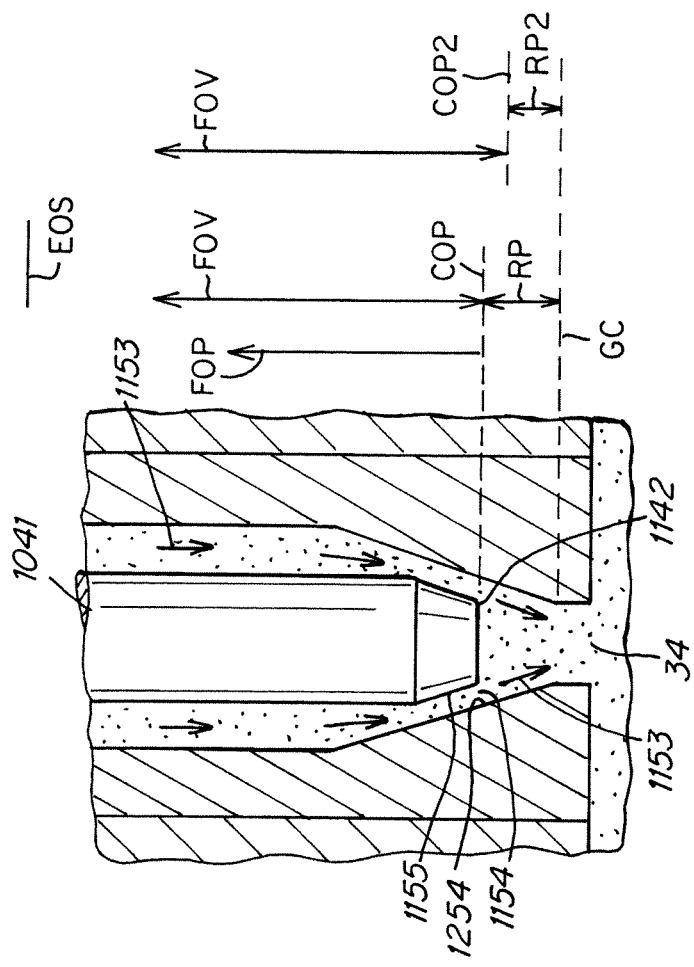
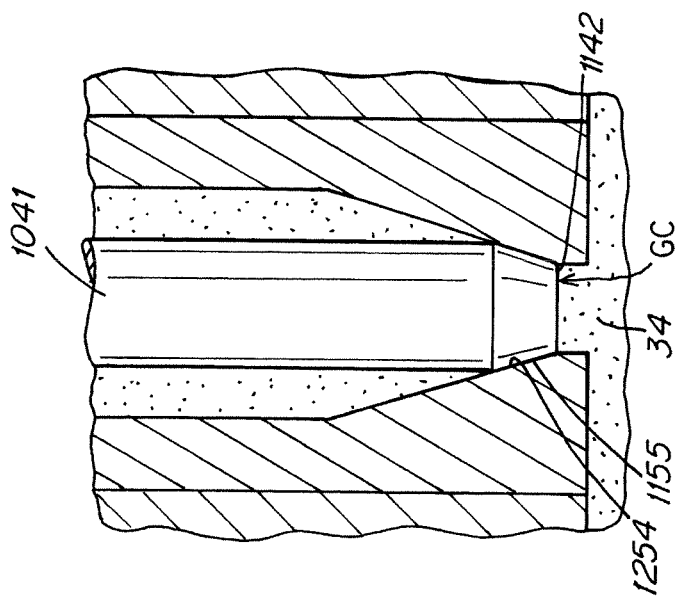

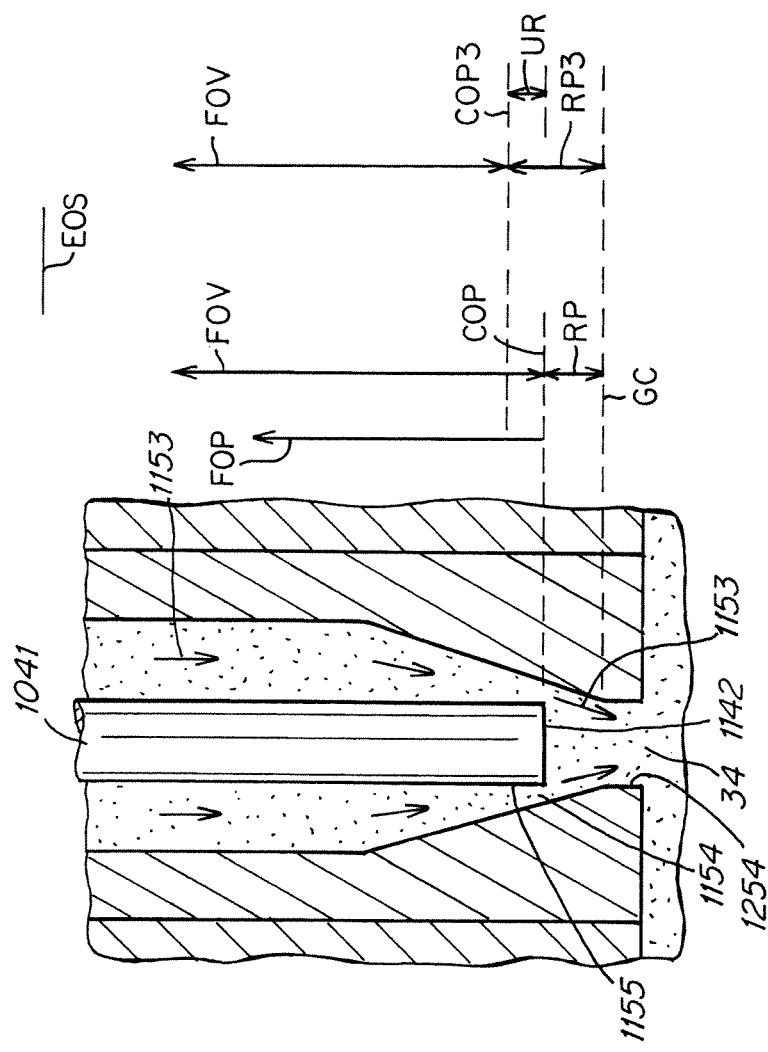
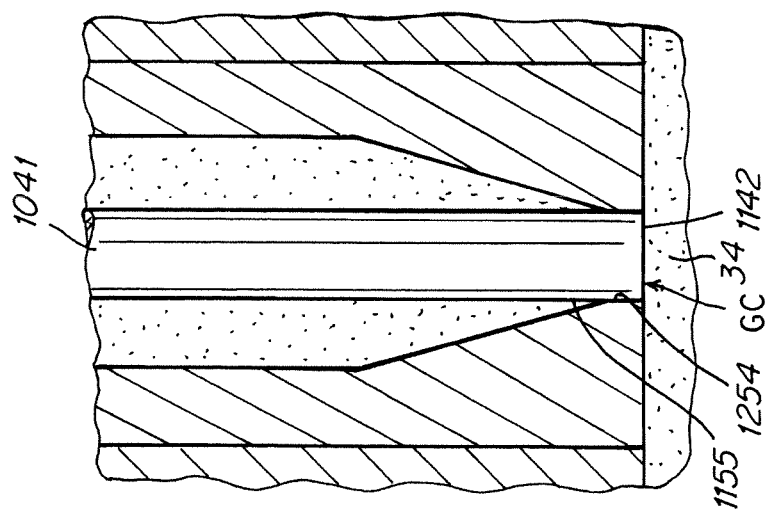
Fig. 4B
Fig. 4A

INJECTION MOLDING FLOW CONTROL APPARATUS AND METHOD

RELATED APPLICATIONS

This application is a continuation of and claims the benefit of priority to international application PCT/US13/56133 which in turn claims the benefit of priority to U.S. Provisional Application Ser. No. 61/692,957 filed Aug. 24, 2012, the disclosures of both of which are incorporated herein in their entirety by reference. This application is also a continuation-in-part of and claims the benefit of priority to U.S. application Ser. No. 13/484,336 filed May 31, 2012 (7100US1) the disclosure of which is incorporated herein by reference. This application is also a continuation-in-part of and claims the benefit of priority to U.S. application Ser. No. 13/484,408 filed May 31, 2012 (7100U53) the disclosure of which is incorporated herein by reference.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 6,824,379, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. Pat. No. 6,005,013, U.S. Pat. No. 6,051,174, U.S. Patent application publication no. 20020147244, U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070) and U.S. application Ser. No. 13/484,336 filed May 31, 2012 (7100US1) and U.S. application Ser. No. 13/484,408 filed May 31, 2012 (7100U53).

BACKGROUND OF THE INVENTION

Injection molding systems have been developed having flow control mechanisms that control the movement of a valve pin over the course of an injection cycle to cause the pin to move either upstream or downstream over the course of injection cycle in order to raise or lower the rate of flow of fluid material to correspond to a predetermined profile of fluid flow rates for the injection cycle. A sensor senses a condition of the fluid material or of the apparatus such as pin position and sends a signal indicative of the sensed condition to a program contained in a controller that uses the signal as a variable input to control movement of the valve pin in accordance with the predetermined profile.

SUMMARY OF THE INVENTION

In accordance with the invention there is provided a method of performing an injection molding cycle in an injection molding apparatus comprising:

a manifold that receives an injection fluid mold material, the manifold having a delivery channel that delivers the injection fluid mold material under an injection pressure to a first gate of a mold cavity, an actuator drivably interconnected to a valve pin having a tip end drivable along a drive path that extends between a first position where the tip end of the valve pin obstructs the gate to prevent the injection fluid material from flowing into the cavity, a second position upstream of the first position wherein the tip end of the valve pin restricts flow of the injection fluid along at least a portion of the length of the drive path extending between the first position and the second position, and a third position upstream of the second position where the injection fluid material flows freely without restriction from the tip end of the pin through the first gate, the actuator being driven by a valve system that is controllably adjustable between a start position, one or more intermediate drive rate positions and a high drive rate position, the actuator being driven upstream at one or more corresponding intermediate rates of travel when the valve system is in the one or more intermediate drive rate positions and at a higher rate of travel than the one or more intermediate rates of travel when the valve system is in the high drive rate position, the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve;

the method comprising:

selecting a predetermined amount of initial withdrawal time;

beginning an injection cycle with the tip end of the valve pin in the first position and the valve system in the start position, adjusting the valve system to operate at the one or more selected intermediate drive rate positions to drive the tip end of the valve pin continuously upstream from the first position to the second position, adjusting the second valve to move from the first to the second position to cause the valve system to operate at the high drive rate position to drive the tip end of the valve pin continuously upstream at the higher rate of travel when the predetermined amount of initial withdrawal time has elapsed.

In accordance with the invention there is also provided a method of performing an injection molding cycle in an injection molding apparatus comprising:

a manifold that receives an injection fluid mold material, the manifold having a delivery channel that delivers the injection fluid mold material under an injection pressure to a first gate of a mold cavity, an actuator drivably interconnected to a valve pin having a tip end drivable along a drive path that extends between a first position where the tip end of the valve pin obstructs the gate to prevent the injection fluid material from flowing into the cavity, a second position upstream of the first position wherein the tip end of the valve pin restricts flow of the injection fluid along at least a portion of the length of the drive path extending between the first position and the second position, and a third position upstream of the second position where the injection fluid material flows freely without restriction from the tip end of the pin through the first gate, the actuator being driven by a valve system that is controllably adjustable between a start position, one or more intermediate drive rate positions and a high drive rate position, the actuator being driven upstream at one or more corresponding intermediate rates of travel when the valve system is in the one or more intermediate drive rate positions and at a higher rate of travel than the one or more intermediate rates of travel when the valve system is in the high drive rate position, the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve;

the method comprising:

selecting the length of travel between the first position and the second position of the actuator, beginning an injection cycle with the tip end of the valve pin in the first position and the valve system in the start position, adjusting the valve system to operate at the one or more selected intermediate drive rate positions to drive the tip end of the valve pin continuously upstream from the first position to the second position, sensing the position of the valve pin to determine when the tip end of the valve pin has reached the second position, adjusting the second valve to move from the first to the second position to cause the valve system to operate at the high drive rate position to drive the tip end of the valve pin continuously upstream at the higher rate of travel when the tip end of the valve pin has been determined in the step of sensing to have reached the second position.

In such a method, the step of adjusting the valve system to operate at the one or more selected intermediate drive rate positions is preferably begun after the injection fluid mold material has been previously injected into the cavity through another gate and the fluid mold material has travelled through the cavity past the first gate. The step of adjusting the valve system to operate at the one or more selected intermediate drive rate positions typically comprises adjusting the first valve to operate at a single intermediate drive rate position.

The high drive rate position of the valve system preferably drives the actuator at a rate of travel that is a maximum at which the valve system is capable of driving the actuator. The length of travel between the first position and the second position of the actuator along the drive path is typically selected to be between about 1 mm and about 5 mm.

The step of sensing typically includes sensing the position of the valve pin with a position sensor that automatically sends one or more signals indicative of the position of the tip end of the valve pin to a control mechanism that automatically adjusts the position of the second valve in response to receipt of the one or more signals from the position sensor.

The tip end of the valve pin preferably restricts flow of the injection fluid along the entire length of the drive path extending between the first position and the second position.

In another aspect of the invention there is provided an apparatus for controlling the rate of flow of fluid mold material from an injection molding machine to a mold cavity, the apparatus comprising:

a manifold receiving the injected fluid mold material, the manifold having a delivery channel that delivers the injected fluid material to a first gate leading to the mold cavity;

an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin, the actuator and the valve pin being translationally driven at a controllable rate of travel by a valve system that is controllably adjustable between a start position, one or more intermediate drive rate positions and a high drive rate position, the actuator being driven upstream at one or more intermediate rates of travel when the valve system is in the one or more intermediate drive rate positions and at a higher rate of travel than the one or more intermediate rates of travel when the valve system is in the high drive rate position;

the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve; a position sensor and a controller, the position sensor sensing the position of the valve pin and sending a signal indicative of the position of the pin to the controller;

the controller instructing the valve system to drive the actuator and the valve pin continuously upstream from the start position to the second position to the third position;

the controller including instructions that instruct the second valve to move from the first position to the second position on receipt by the controller of a signal from the position sensor that is indicative of the valve pin having reached the second position.

Such an apparatus preferably further comprises an electrical signal generating device interconnected to the first valve to controllably adjust the first valve to a selected degrees of openness, the electrical signal generating device generating an electrical signal of controllably variable degree of output, the first valve being adjustable in degree of openness that is approximately proportional to the degree of output of the electrical signal.

The portion of the drive path over which the flow of injected material is restricted is typically at least about 30% of the length of the drive path between the first position and the second position. The length of the drive path between the first position and the second position is typically between about 1 mm and about 5 mm. The valve pin and actuator are typically driven at a maximum rate of upstream travel that the valve system is capable of driving the actuator at when the valve system is in the high drive rate position. The rate of travel of the valve pin corresponding to the highest of the one or more intermediate drive positions of the valve system is typically less than about 75% of the rate of travel of the valve pin corresponding to the high drive position.

In another aspect of the invention there is provided an apparatus for controlling the rate of flow of fluid mold material from an injection molding machine to a mold cavity, the apparatus comprising:

a manifold receiving the injected fluid mold material, the manifold having a delivery channel that delivers the injected fluid material to a first gate leading to the mold cavity;

an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin, the actuator and the valve pin being translationally driven at a controllable rate of travel by a valve system that is controllably adjustable between a start position, one or more intermediate drive rate positions and a high drive rate position, the actuator being driven upstream at one or more intermediate rates of travel when the valve system is in the one or more intermediate drive rate positions and at a higher rate of travel than the one or more intermediate rates of travel when the valve system is in the high drive rate position;

the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve;

a controller including a timer, the timer including a memory containing a preselected period of time over which the first valve is interconnected to the source and the second valve is in the second position;

the controller instructing the valve system to drive the actuator and the valve pin continuously upstream from the start position to the second position to the third position;

the controller including instructions that instruct the second valve to move from the second position to the first position on receipt by the controller of a signal from the controller that the timer has determined that the preselected period of time has elapsed since the start of the injection cycle.

In another aspect of the invention there is provided an apparatus for controlling the rate of flow of fluid mold material from an injection molding machine to a mold cavity, the apparatus comprising:

a manifold receiving the injected fluid mold material, the manifold having a delivery channel that delivers the injected fluid material to a first gate leading to the mold cavity;

an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin, the actuator and the valve pin being translationally driven at a controllable rate of travel by a valve system that is controllably adjustable between a start position, one or more intermediate drive rate positions and a high drive rate position, the actuator being driven upstream at one or more intermediate rates of travel when the valve system is in the one or more intermediate drive rate positions and at a higher rate of travel than the one or more intermediate rates of travel when the valve system is in the high drive rate position;

the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve;

a controller, the controller instructing the valve system to drive the actuator and the valve pin continuously upstream from the start position to the second position to the third position;

the controller including instructions that instruct the second valve to move from the second position to the first position on receipt by the controller of a signal that is indicative of the valve pin having reached the second position or an elapse of a predetermined amount of time.

BRIEF DESCRIPTION OF THE DRAWINGS

The above and further advantages of the invention may be better understood by referring to the following description in conjunction with the accompanying drawings in which:

FIGS. 3A-3B show tapered end valve pin positions at various times and positions between a starting closed position as in FIG. 3A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the hydraulic pressure is normally at full pressure and pin velocity is at its maximum;

FIGS. 4A-4B show a system having a valve pin that has a cylindrically configured tip end, the tips ends of the pins being positioned at various times and positions between a starting closed position as in FIG. 4A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the hydraulic pressure of a hydraulic actuator is normally at full pressure and pin velocity is at its maximum;

DETAILED DESCRIPTION

Figure 1:
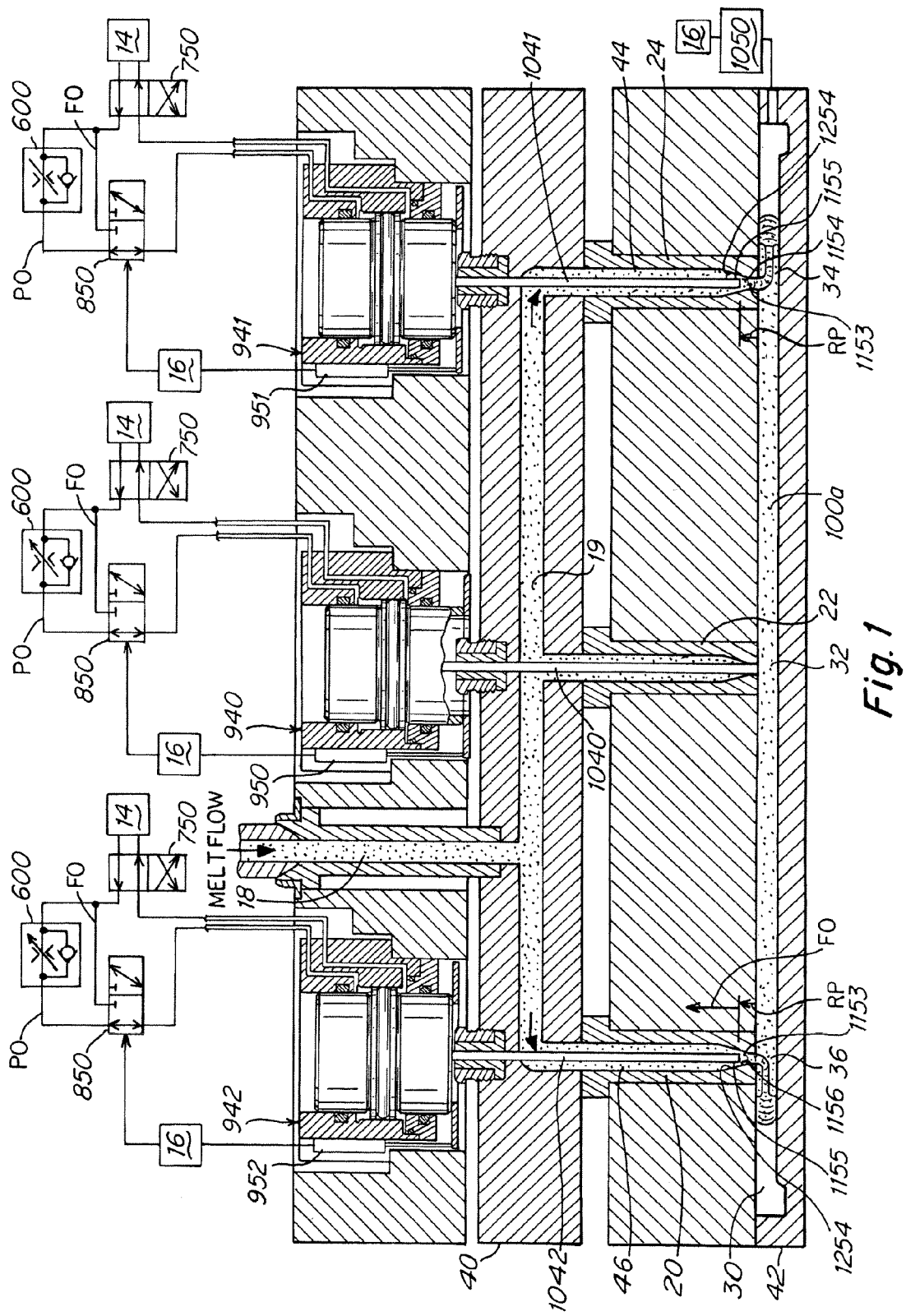
FIG. 1 is a schematic, sectional view of one embodiment of the invention showing a pair of sequential gates showing a first gate entering the center of a cavity having been opened and shown closed such that a first shot of fluid material has entered the cavity and traveled past the position of a second sequential gate, the second gate shown being open with its valve pin having traveled along an upstream restricted flow path RP allowing a second sequential shot of fluid material to flow into and merge with the first shot of material within the cavity.

FIG. 1 shows a system 10 with a central nozzle 22 feeding molten material melt flow from an injection molding machine (not shown) through a main inlet 18 to a distribution channel 19 of a manifold 40. The distribution channel 19 commonly feeds three separate nozzles 20, 22, 24 which all commonly feed into a common cavity 30 of a mold 42. One of the nozzles 22 is controlled by actuator 940 and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

Figure 1A:
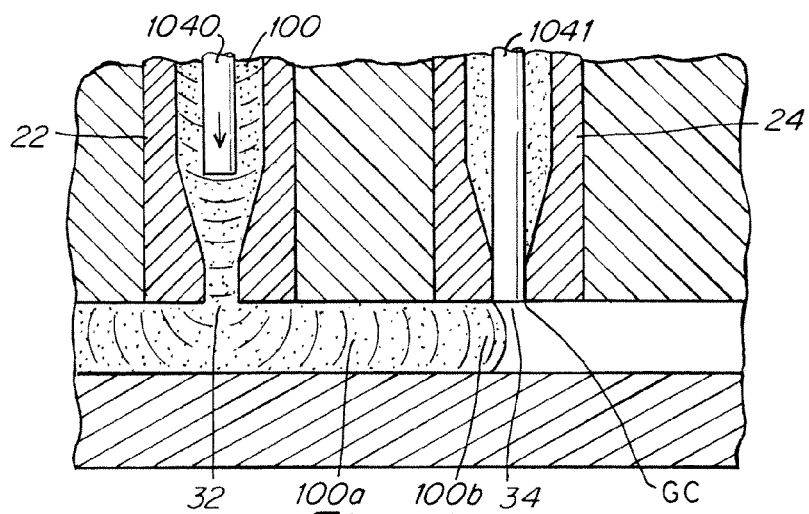
FIGS. 1A-1E are schematic cross-sectional close-up views of the center and one of the lateral gates of the FIG. 1 apparatus showing various stages of the progress of injection.
Figure 1B:
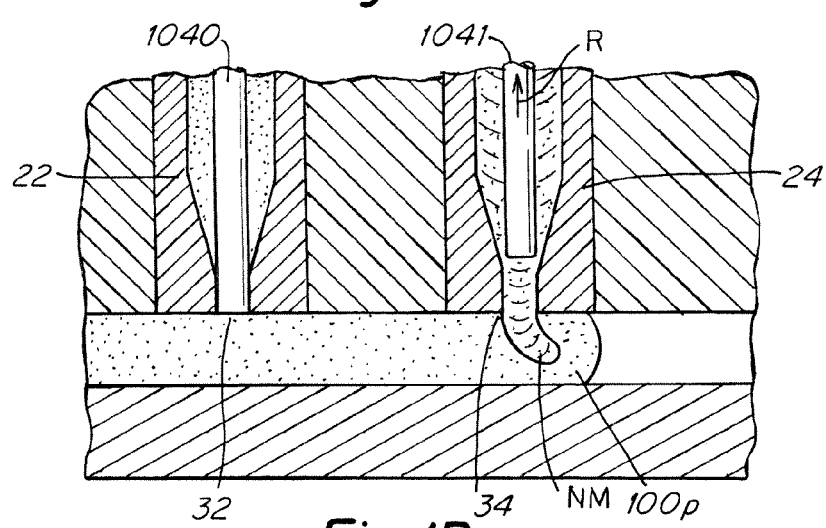
Figure 1C:
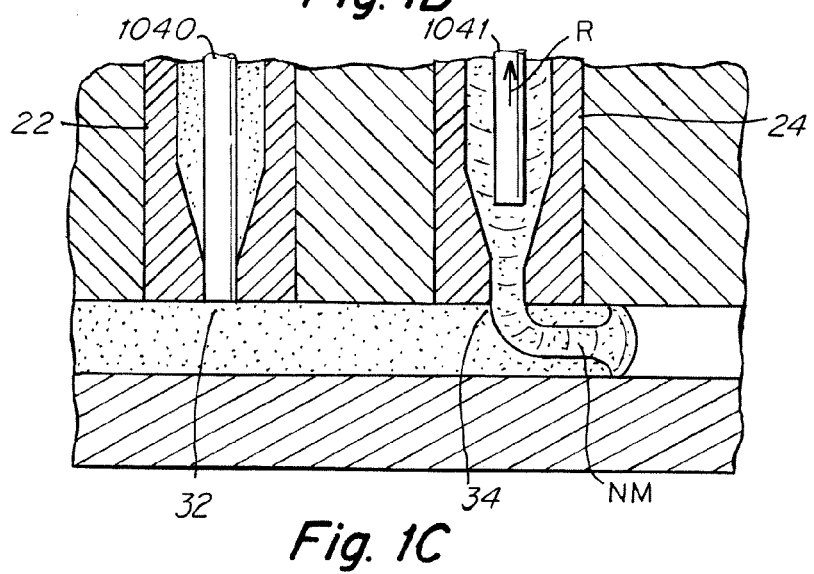

As shown in FIGS. 1, 1A the injection cycle is a cascade process where injection is effected in a sequence from the center nozzle 22 first and at a later predetermined time from the lateral nozzles 20, 24. As shown in FIG. 1A the injection cycle is started by first opening the pin 1040 of the center nozzle 22 and allowing the fluid material 100 (typically polymer or plastic material) to flow up to a position the cavity just before 100b the distally disposed entrance into the cavity 34, 36 of the gates of the lateral nozzles 24, 20 as shown in FIG. 1A. After an injection cycle is begun, the gate of the center injection nozzle 22 and pin 1040 is typically left open only for so long as to allow the fluid material 100b to travel to a position just past 100p the positions 34, 36. Once the fluid material has travelled just past 100p the lateral gate positions 34, 36, the center gate 32 of the center nozzle 22 is typically closed by pin 1040 as shown in FIGS. 1B, 1C, 1D and 1E. The lateral gates 34, 36 are then opened by upstream withdrawal of lateral nozzle pins 1041, 1042 as shown in FIGS. 1B-1E. As described below, the rate of upstream withdrawal or travel velocity of lateral pins 1041, 1042 is controlled as described below.

In alternative embodiments, the center gate 32 and associated actuator 940 and valve pin 1040 can remain open at, during and subsequent to the times that the lateral gates 34, 36 are opened such that fluid material flows into cavity 30 through both the center gate 32 and one or both of the lateral gates 34, 36 simultaneously.

When the lateral gates 34, 36 are opened and fluid material NM is allowed to first enter the mold cavity into the stream 102p that has been injected from center nozzle 22 past gates 34, 36, the two streams NM and 102p mix with each other. If the velocity of the fluid material NM is too high, such as often occurs when the flow velocity of injection fluid material through gates 34, 36 is at maximum flow rate when the valve pin 1041 is withdrawn at maximum speed, a visible line or defect in the mixing of the two streams 102p and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102p, the appearance of a visible line or defect in the final molded product can be reduced or eliminated.

The rate or velocity of upstream withdrawal of pins 1041, 1042 starting from the closed position can be controlled by a combination of the use of interconnected valves that control the rate of flow of hydraulic or pneumatic actuator drive fluid to the fluid sealed cavities between the cylinder and the piston flange of the actuators. The three interconnected valves comprise a manually adjustable valve 600, an automatically adjustable valve 850 and flow directional valve 14. The manually adjustable valve 600 can be set to any desired position of openness (0-100%) by the user, the lesser or greater the degree of openness to which the valve 600 is adjusted, the slower or faster the rate R at which the piston of the actuator 941, 940, 942 is driven upstream and concomitantly the slower or faster the rate at which an associated valve pin 1041, 1040, 1042 is driven upstream.

A "controller," as used herein, refers to electrical and electronic control apparati that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

The user programs controller 16 via data inputs on a user interface to instruct the hydraulic system 700 to drive pins 1041, 1042 at a preselected upstream velocity that is reduced relative to a maximum velocity that the hydraulic system is capable of driving the pins 1041, 1042 and then subsequently at the maximum velocity after an initial period of reduced withdrawal velocity. As described below, such reduced pin withdrawal rate or velocity can executed until a position sensor such as 951, 952 detects that an actuator 941, 952 or an associated valve pin (or another component), has reached a certain position such as the end point COP, COP2, FIGS. 3B, 4B of a restricted flow path RP, RP2 or until a predetermined amount of time has elapsed. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds.

Figure 1D:
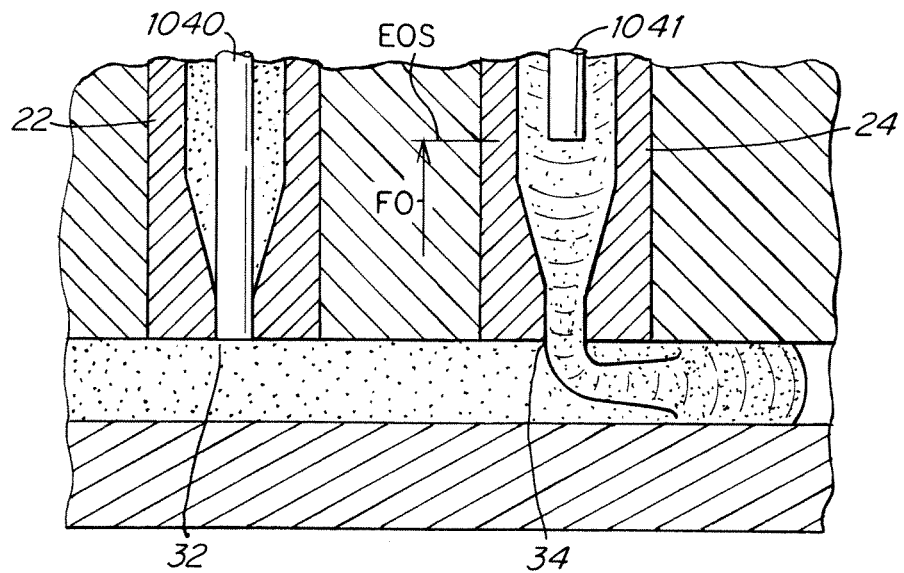
Figure 1E:
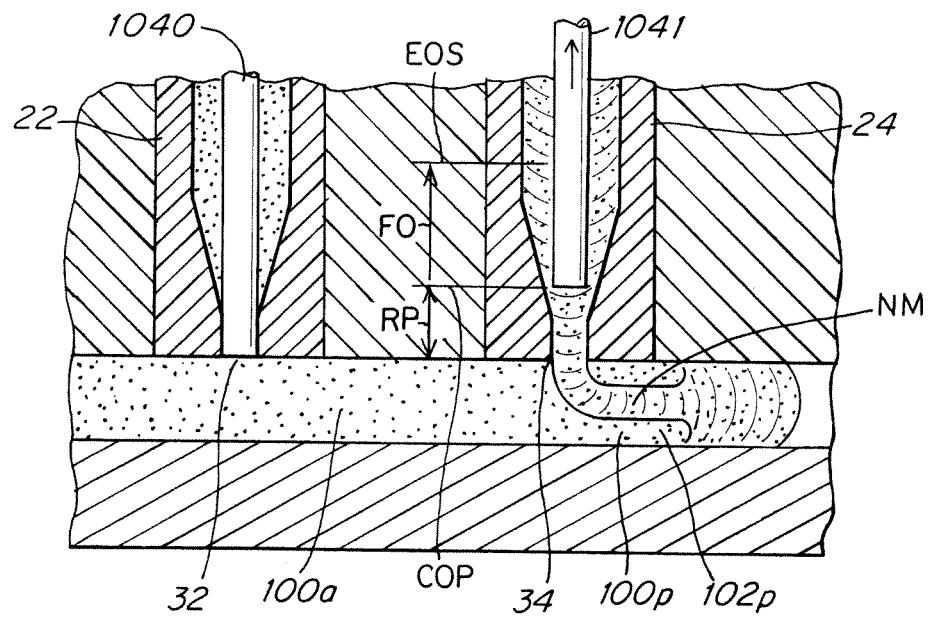

FIG. 1 shows position sensors 950, 951, 952 for sensing the position of the actuator cylinders 941, 942 and their associated valve pins (such as 1041, 1042) and feed such position information to controller 16 for monitoring purposes. As shown, fluid material 18 is injected from an injection machine into a manifold runner 19 and further downstream into the bores 44, 46 of the lateral nozzles 24, 22 and ultimately downstream through the gates 32, 34, 36. When the pins 1041, 1042 are withdrawn upstream to a position where the tip end of the pins 1041 are in a fully upstream open position such as shown in FIG. 1D, the rate of flow of fluid material through the gates 34, 36 is at a maximum. However when the pins 1041, 1042 are initially withdrawn beginning from the closed gate position, FIG. 1A, to intermediate upstream positions, FIGS. 1B, 1C, a gap 1154, 1156 that restricts the velocity of fluid material flow is formed between the outer surfaces 1155 of the tip end of the pins 44, 46 and the inner surfaces 1254, 1256 of the gate areas of the nozzles 24, 20. The restricted flow gap 1154, 1156 remains small enough to restrict and reduce the rate of flow of fluid material 1153 through gates 34, 36 to a rate that is less than maximum flow velocity over a travel distance RP of the tip end of the pins 1041, 1042 going from closed to upstream as shown in FIGS. 1, 1B, 1C, 1E and 3B, 4B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 3B, 4B, the pins 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

Figure 2:
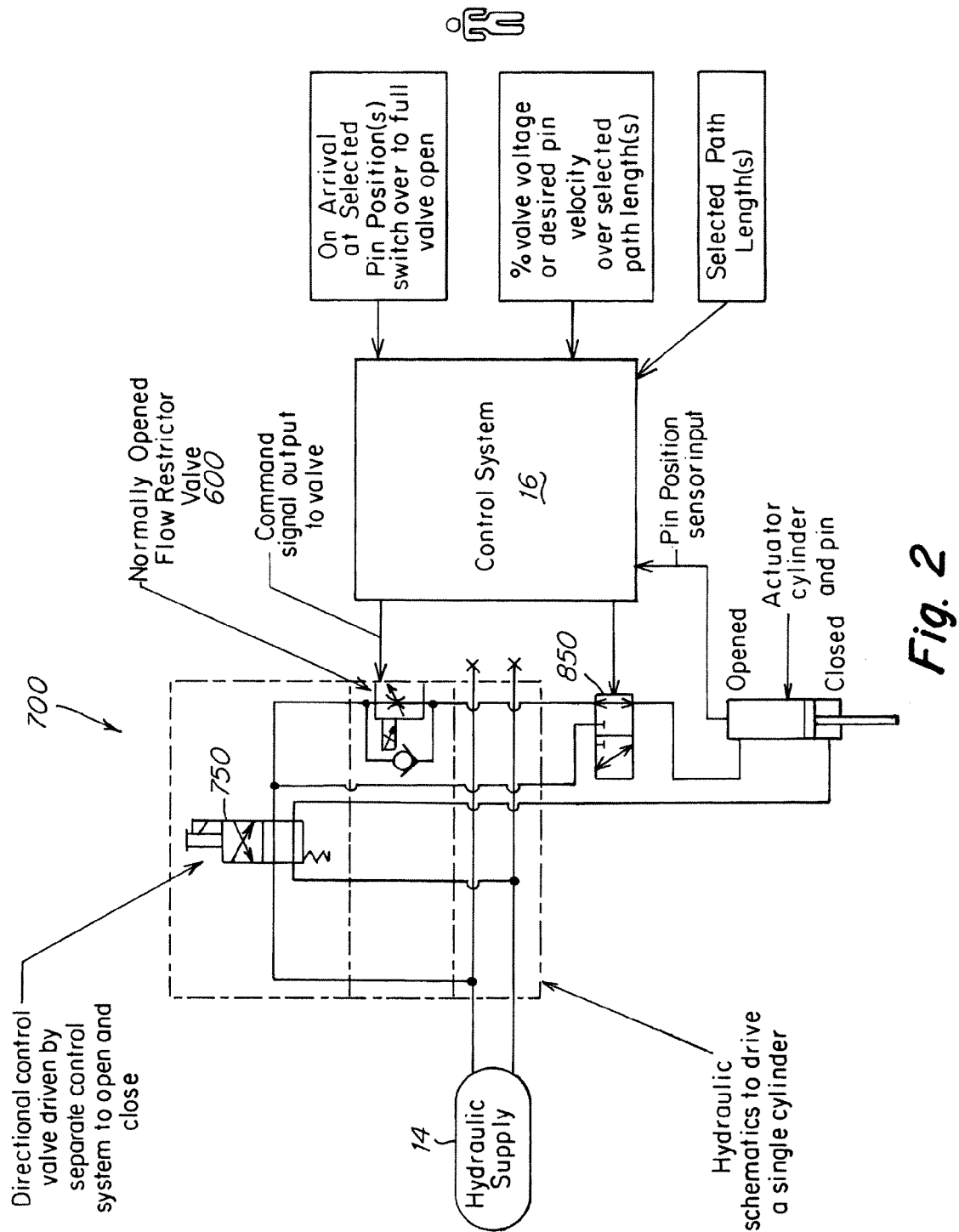
FIG. 2 is a schematic of an embodiment of the invention showing a hydraulically actuated valve pin in which one port of the actuator is connected to a valve 850 that is electronically controlled to controllably switch hydraulic drive fluid input to the actuator between a direct input at maximum pressure from a source of hydraulic fluid supply and an input from an intermediate manually adjustable flow restrictor valve 600 that reduces the maximum pressure input from the source of supply.
Figure 2A:
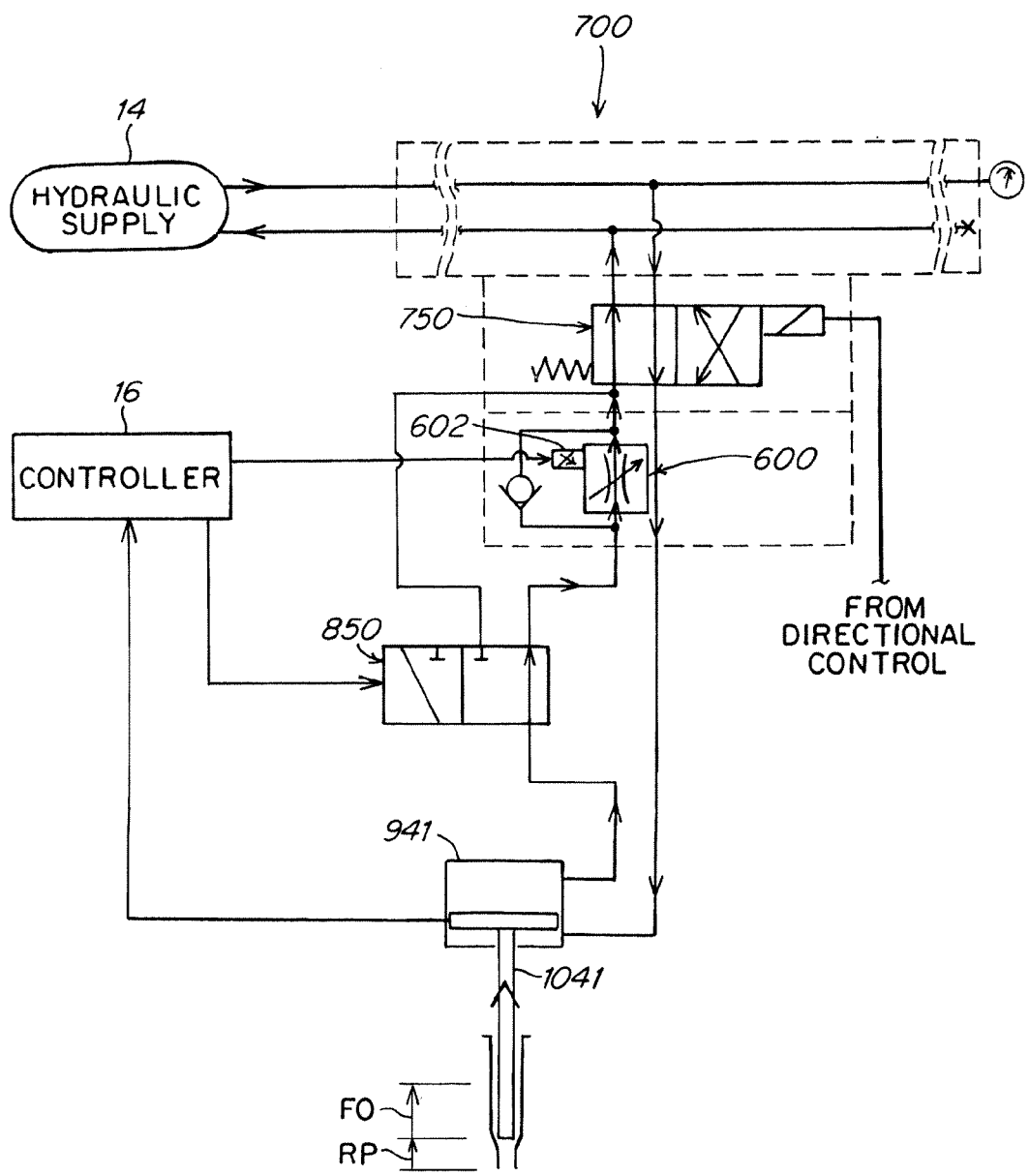
FIGS. 2A, 2B are schematic cross-sectional views of the hydraulic valve system of FIG. 2 showing in 2A the switch valve 850 in a position where flow of drive fluid is routed during the upstream withdrawal half of an injection cycle through the restrictor valve 600 and showing in 2B the switch valve 850 in a position where flow of drive fluid is routed directly from the source of hydraulic supply 14 at maximum drive pressure.
Figure 2B:
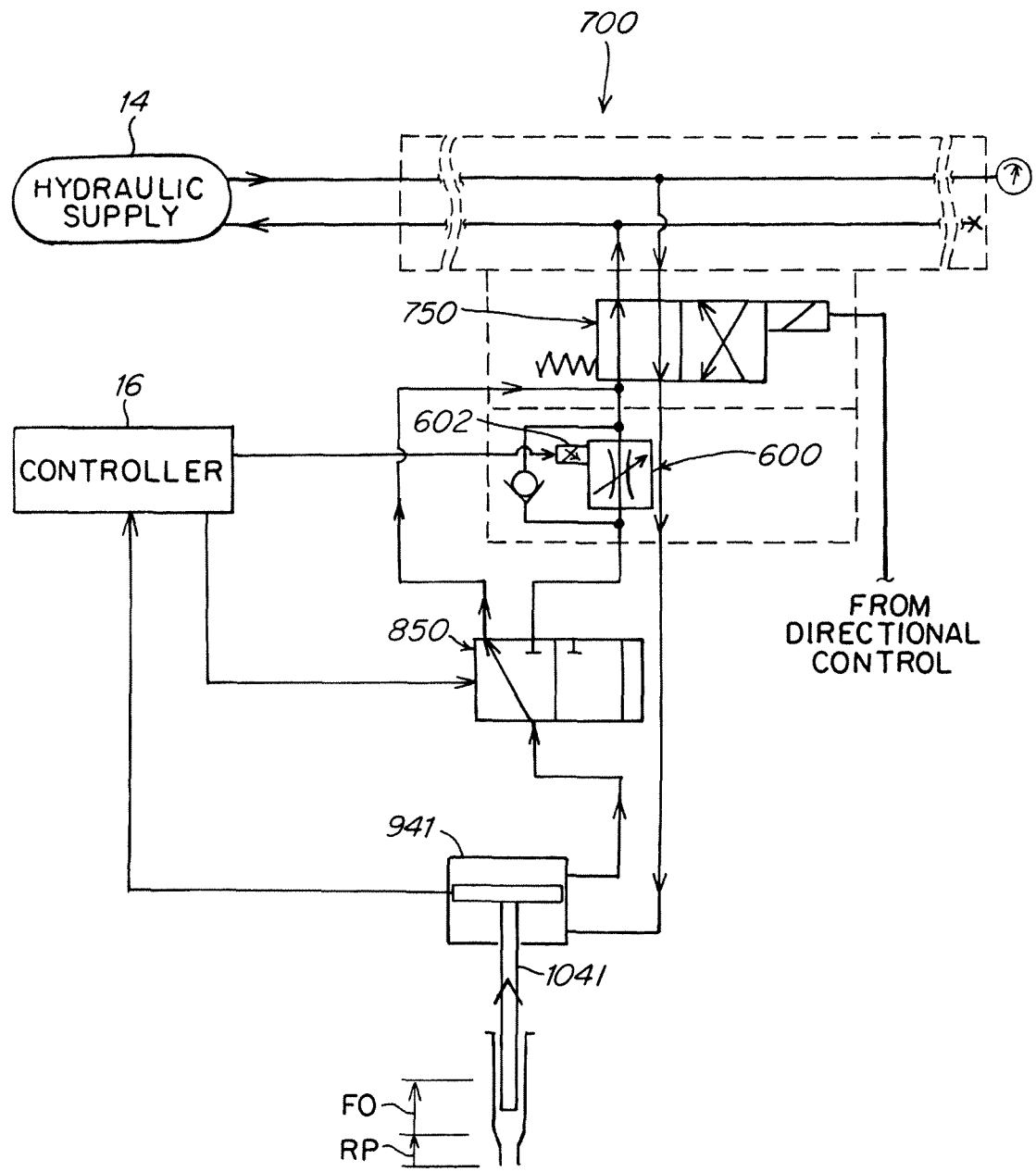
Figure 2C:
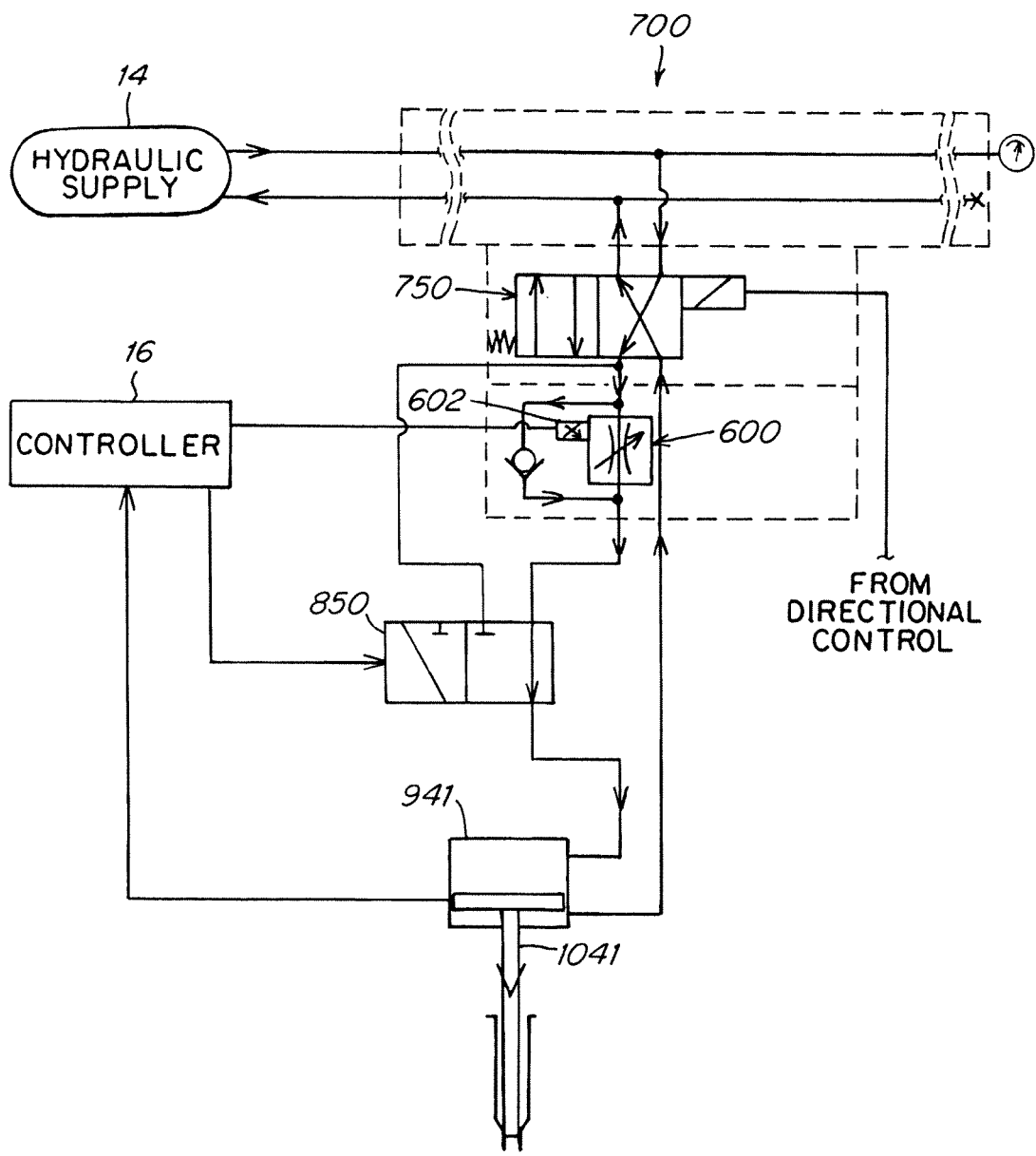
FIG. 2C is a schematic cross-sectional view similar to FIG. 2A showing the directional valve in a position that routes the drive fluid through the restrictor valve 600 during the downstream closure half of the injection cycle.

RP can be about 1-8 mm in length and more typically about 2-6 mm and even more typically 2-4 mm in length. As shown in FIG. 2 in such an embodiment, a control system or controller 16 is preprogrammed to control the sequence and the rates of valve pin 1040, 1041, 1042 opening and closing. The controller 16 controls the rate of travel, namely velocity of upstream travel, of a valve pin 1041, 1042 from its gate closed position for at least the predetermined amount of time that is selected to withdraw the pin at the selected reduced velocity rate.

The velocity of withdrawal of the valve pins 1041, 1042 during the initial reduced velocity portion of the cycle is determined by the preselected setting of degree of openness of the flow restrictor valve 600, FIGS. 1, 2, 2A, 2B. Adjustment of the flow restrictor valve 600 to less than 100% open thus reduces the rate and volume flow of pressurized hydraulic fluid to the actuator cylinders thus in turn reducing the velocity of upstream travel of the pins 1041, 1042 for the pre-selected period of time or the pre-selected length of upstream travel.

In embodiments where a position sensor is used, at the end of the travel or length of path RP, RP2, the position sensor or timer signals the controller 16, the controller 16 determines that the end COP, COP2 has been reached and the valve 850 is activated to connect the hydraulic drive fluid directly to the hydraulic supply at maximum drive pressure and the valve pins 1041, 1042 are driven at maximum upstream velocity FOV in order to reduce the cycle time of the injection cycle.

The valve 600 typically comprises a restrictor valve that is controllably positionable anywhere between completely closed (0% open) and completely open (100% open). Adjustment of the position of the restrictor valve 600 is typically accomplished manually at the beginning of the cycle via a source of electrical power that controllably drives an electromechanical mechanism that causes the valve to rotate such as a rotating spool that reacts to a magnetic or electromagnetic field created by the electrical signal output of the controller 16, namely an output of electrical energy, electrical power, voltage, current or amperage the degree or amount of which can be readily and controllably varied by conventional electrical output devices. The electro-mechanism is controllably drivable to cause the valve 600 to open or close to a degree of openness that is proportional to the amount or degree of electrical energy that is input to drive the electro-mechanism. The velocity of upstream withdrawal travel of the pins 1041, 1042 are in turn proportional to the degree of openness of the valve 600. Thus the rate of upstream (or downstream) travel of the pins 1041, 1042 is proportional to the amount or degree of electrical energy that is input to the electro-mechanism that drives valves 600 to its preselected position at the beginning of the cycle. Thus the user preselects a reduced upstream velocity of the pins

1041, 1042 by inputting to the controller 16 a percentage of the maximum amount of electrical energy or power input (voltage or current) needed to open the valve 600 to 100% open. The user inputs such selections into the controller 16. The user also selects the length of the path of travel RP, RP2 of the valve pin or the position of the valve pin or other component over the course of travel of which the valve 600 is to be maintained partially open and inputs such selections into the controller 16. The controller 16 includes conventional programming or circuitry that receives and executes the user inputs. The controller may include programming or circuitry that enables the user to input as a variable a selected pin velocity rather than a percentage of electrical output, the programming of the controller 16 automatically converting the inputs by the user to appropriate instructions for reduced energy input to the electro-mechanism that drives the valve 600.

Typically the user selects one or more reduced velocities that are less than about 90% of the maximum velocity (namely velocity when the valve 600 is fully open), more typically less than about 75% of the maximum velocity and even more typically less than about 50% of the maximum velocity at which the pins 1041, 1042 are drivable by the hydraulic system. The actual maximum velocity at which the actuators 941, 942 and their associated pins 1041, 1042 are driven is predetermined by selection of the size and configuration of the actuators 941, 942, the size and configuration of the restriction valve 600 and the degree of pressurization and type of hydraulic drive fluid selected for use by the user. The maximum drive rate of the hydraulic system is predetermined by the manufacturer and the user of the system and is typically selected according to the application, size and nature of the mold and the injection molded part to be fabricated.

In the FIG. 5A example, the reduced pin velocity is selected as 50 mm/sec. In practice the actual velocity of the pin may or may not be precisely known, the Y velocity axis corresponding (and generally being proportional) to the degree of electrical energy input to the motor that controls the opening of the flow restriction valve, 100 mm/sec corresponding to the valve 600 being completely 100% open (and pin being driven at maximum velocity); and 50 mm/sec corresponding to 50% electrical energy input to the electro-mechanism that drives the restriction valve 600 to one-half of its maximum 100% degree of openness. In the FIG. 5A example, the path length RP over which the valve pin 1041, 1042 travels at the reduced 50 mm/sec velocity is 4 mm. After the pin 1041, 1042 has been driven to the upstream position COP position of about 4 mm from the gate closed GC position, the controller 16 instructs the electro-mechanism that drives the valve 600 (typically a magnetic or electromagnetic field driven device such as a spool) to open the restrictor valve 600 to full 100% open at which time the pin (and its associated actuator piston) are driven by the hydraulic system at the maximum travel rate 100 mm/sec for the predetermined, given pressurized hydraulic system.

The valves 600 can be adapted to be adjustable by hand by a user to a selected degree of openness. Alternatively the valves 600 can be adjustable remotely by a user by operation of a mechanical or an electromechanical drive mechanism that is interconnected to a mechanically adjustable member of which the valve 600 is comprised such as a ball having a flow channel which, depending on its degree of rotation within a complementary socket adjusts the degree or rate or volume of flow of drive fluid to the actuators 940-942. The valves 600 are typically adapted to be adjustable to any one of a plurality of selectable stationary positions of degree of openness, the valves 600 remaining in a single stationary position selected by the user for the duration of one or more selected injection cycles.

The valves 600 are interconnected to automatically adjustable valves 850. Valves 850 are movable between two positions FO and PO where the valve 850 is either directly connected FO to the source 14 of hydraulic drive fluid or indirectly connected PO to the source 14 first through a valve 600. Whether directly connected in the FO position or indirectly in the PO position, valves 850 enable maximum full open flow of the drive fluid being received. Thus when the valves 850 are in the FO position the hydraulic system 14 drives the actuators and associated valve pins 1040-1041 at maximum velocity. The directional valves 750 are adjustable to control the direction of drive fluid flow to and from valves 850 and 600.

The valves 850 are movable between at least two positions, FO and PO. In one embodiment, the valves can be moved between the FO and PO positions via a trigger or control mechanism 16 that automatically instructs a valve 850 to move between the FO and PO positions upon or according to receipt of a trigger signal from a position sensor such as 950,951,952 that can sense the axial position of an actuator 940, 941, 942 (or the valve pin 1040, 1041, 1042) or from a temperature or pressure sensor 1050 that can sense temperature or pressure of the injection fluid material in the mold cavity 30 or the temperature or pressure of an operational component of the apparatus such as the fluid distribution manifold or a nozzle.

The valves 850 are interconnected to the directional valves 750 and to the manually adjustable valves 600 such that when the valves 850 are in the FO position, the flow of drive fluid from source 14 bypasses the manually adjustable valves 600 and is routed directly and exclusively through valves 850. When moved into the other of the two positions, namely the PO position, the automatically adjustable valves 850 enable and allow the directional valves 750 route the flow of drive fluid first through valves 600 which in turn routes the drive fluid through valves 850.

In one embodiment, the valves 850 are set at the beginning of an injection cycle to the PO position, and one or more of valves 600 are set, typically manually (or electronically) by the user to a position or setting where the volume or rate of flow of the drive fluid through a valve 600 to valve 850 (and in turn to actuators 941, 940, 942) is less than 100%, for example 50%. This reduced rate of flow of drive fluid in turn concomitantly reduces the velocity of upstream withdrawal R of valve pins 1041, 1040, 1042, FIGS. 1A-E, to less than 100% of the maximum velocity at which the hydraulic drive system of the apparatus is capable of driving the fluid drivable actuators 940-942. For the same injection cycle, the trigger or control 16 is pre-set or programmed to instruct the valves 850 to move from the PO position to the FO position upon the occurrence of a preselected event such as an elapse of a pre-selected period of time or upon the detection by a sensor 950-952 of a piston of an actuator 1040-1042 having reached a pre-selected trigger position of upstream travel or upon a sensor 1050 having detected a pre-selected trigger temperature or pressure of injection fluid material.

In another embodiment, after the user selects the degree of openness to which valve 600 is set (typically manually), the user can preselect a period of time over which a valve pin such as downstream pin 1041 is to be driven at a less than 100% velocity beginning from the start of an injection cycle when the pin 1041 is in a gate closed position.

Or, alternatively, the user can preselect an upstream position of travel to which the actuator 941 (or valve pin 1041) can travel at which position, the position detector 951 signals the controller 16 which in turn triggers the valve 850 to automatically move or switch from the PO position to the FO. In such an embodiment, the user can thus control movement of a valve pin 1040-1042 to follow a velocity versus time profile such as shown in FIG. 5.

Preferably, the valve pin and the gate are configured or adapted to cooperate with each other to restrict and vary the rate of flow of fluid material 1153, FIGS. 3A-3B, 4A-4B over the course of travel of the tip end of the valve pin through the restricted velocity path RP. Most typically as shown in FIGS. 3A, 3B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP (which is, for example the 4 mm upstream travel position of FIG. 5).

Figure 5:
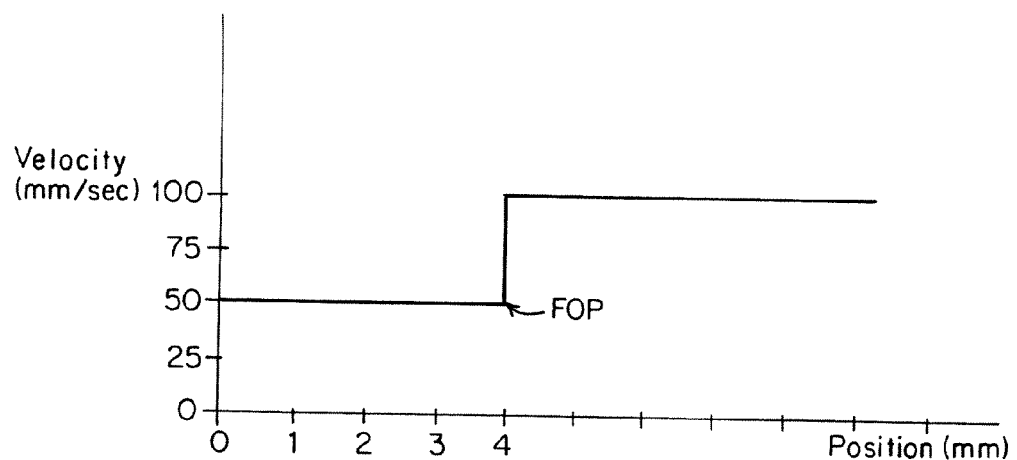
FIG. 5 is a plot of pin velocity versus position representing one example of the opening of a gate lateral to a central gate via continuous upstream withdrawal of a valve pin at one rate over an initial flow path RP and at another higher rate rate of upstream withdrawal of the valve pin beginning at a pin position of FOP and beyond when the fluid material flow is typically at a maximum unrestricted rate of flow through the open gate without any restriction or obstruction from the tip end of the pin.

In one embodiment, as the tip end 1142 of the pin 1041 continues to travel upstream from the gate closed GC position (as shown for example in FIGS. 3A, 4A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), FIG. 5, where the pin is no longer restricting flow of injection mold material through the gate. In such an embodiment, at the expiration of the predetermined amount of time when the pin tip 1142 reaches the FOP (full open) position FIG. 5 the pin 1041 is immediately driven by the hydraulic system at maximum velocity FOV (full open velocity) typically such that the restriction valve 600 is opened to full 100% open.

In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV. In the alternative examples shown in the FIGS. 3B, 4B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 3B the maximum fluid flow rate for injection material 1153 is reached at the upstream position COP of the tip end 1142. In another example shown in FIG. 3B 4B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In the FIG. 5 example, the upstream FOP position is about 4 mm upstream from the gate closed position. Other alternative upstream FOP positions can be selected.

In another alternative embodiment, shown in FIG. 4B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection mold system. In this FIG. 4B example the velocity or drive rate of the pin 1041 is not changed over until the tip end of the pin 1041 or actuator 941 has reached the changeover position COP3. As in other embodiments, a position sensor senses either that the valve pin 1041 or an associated component has travelled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 16 being programmed to instruct the drive system for the actuator to be driven at one or more reduced velocities for the time or path length of an entire closed GC to fully open EOS cycle.

In the FIG. 5 example, FOV is 100 mm/sec. Typically, when the time period for driving the pin 1041 at reduced velocity has expired and the pin tip 1142 has reached the position COP, COP2, the restriction valve 600 is opened to full 100% open velocity FOV position such that the pins 1041, 1042 are driven at the maximum velocity or rate of travel that the hydraulic system is capable of driving the actuators 941, 942. Alternatively, the pins 1041, 1042 can be driven at a preselected FOV velocity that is less than the maximum velocity at which the pin is capable of being driven when the restriction valve 600 is fully open but is still greater than the selected reduced velocities that the pin is driven over the course of the RP, RP2 path to the COP, COP2 position.

At the expiration of the predetermined reduced velocity drive time, the pins 1041, 1042 are typically driven further upstream past the COP, COP2 position to a maximum end-of-stroke EOS position. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

The controller 16 can comprise a timer or a more complex electrical or electronic control apparatus that comprises a single box or multiple boxes (typically interconnected and communicating with each other) that contain(s) all of the separate electronic processing, memory and electrical signal generating components that are necessary or desirable for carrying out the methods and functions and constructing the apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position.

Figure 6A:
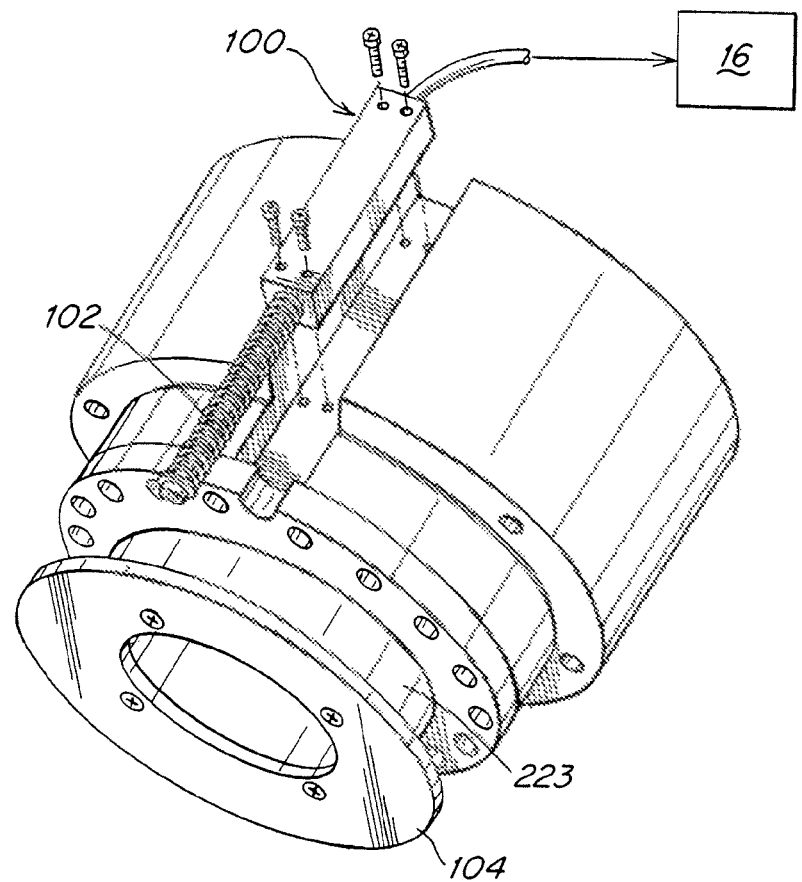
FIGS. 6A-6B show various embodiments of position sensors that can be used in a variety of specific implementations of the invention, the sensors shown in these figures being mounted so as to measure the position of the piston component of the actuator which is indicative of the position of the valve pin relative to the gate.
Figure 6B:
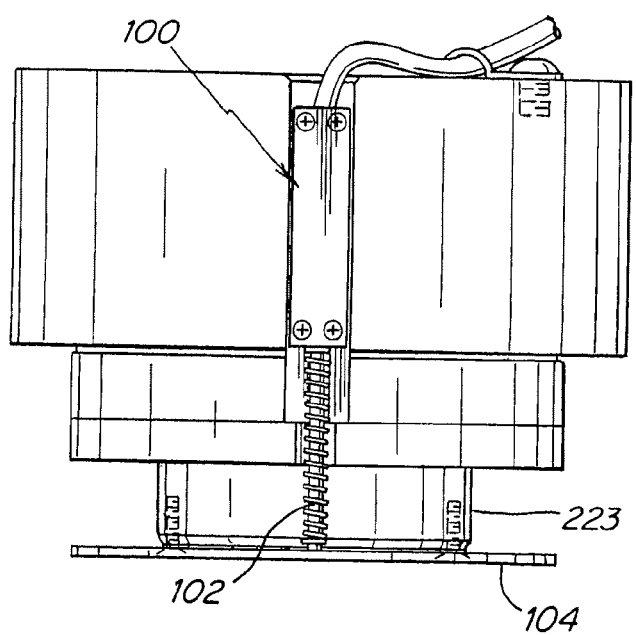
Figure 6C:
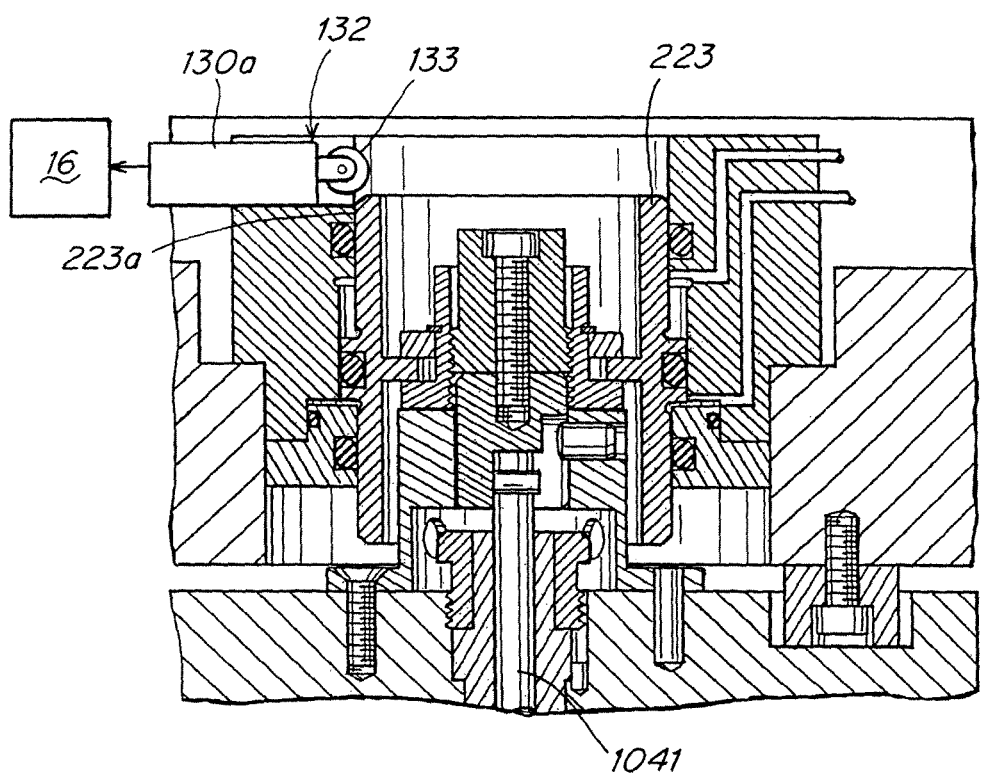
FIGS. 6C-6D show embodiments using limit switches that detect and signal specific positions of the actuator that can be sued to determine velocity, position and switchover to higher openness of valve restrictor and/or upstream velocity of travel of the actuator and valve pin.
Figure 6D:
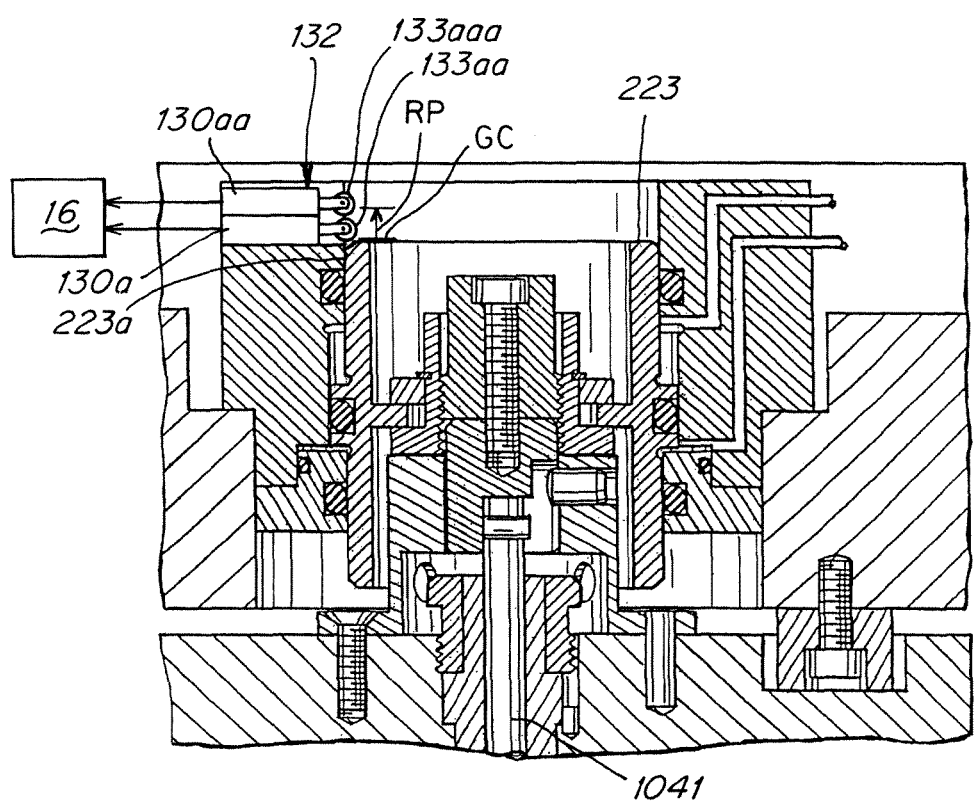

FIGS. 6A-6D show various examples of position sensors 100, 114, 227, 132 the mounting and operation of which are described in U.S. Patent Publication no. 20090061034 the disclosure of which is incorporated herein by reference. As shown the position sensors shown in FIGS. 6A and 6B for example can track and signal the position of the piston of the actuator piston 223 continuously along its entire path of travel from which data pin velocity can be continuously calculated over the length of RP via spring loaded follower 102 that is in constant engagement with flange 104 during the course of travel of piston 223. Mechanism 100 constantly sends signals to controller 16 in real time to report the position of pin 1041 and its associated actuator. FIGS. 6C, 6D show alternative embodiments using position switches that detect position at specific individual positions of the actuator and its associated valve pin 1041. The FIG. 6C embodiment uses a single trip position switch 130a with trip mechanism 133 that physically engages with the piston surface 223a when the piston 223 reaches the position of the trip mechanism 133. The FIG. 6D embodiment shows the use of two separate position switches 130a, 130aa having sequentially spaced trips 133aa and 133aaa that report the difference in time or distance between each trip engaging surface 223a of the piston, the data from which can be used by controller 16 to calculate velocity of the actuator based on the time of travel of the actuator from tripping one switch 130a and then tripping the next 130aa. In each embodiment the position switch can signal the controller 16 when the valve pin 1041, 1042 has travelled to a selected upstream gate open position. As can be readily imagined other position sensor mechanisms can be used such as optical sensors, sensors that mechanically or electronically detect the movement of the valve pin or actuator or the movement of another component of the apparatus that corresponds to movement of the actuator or valve pin.

In alternative embodiments the controller 16 can comprise a processor and instructions that receive or record time elapse or pin position or temperature or pressure information signals from a sensor. The controller can calculate the real time velocity of the pin from the pin position data in real time at one or more times or positions over the course of the pin travel through the RP path length and/or beyond. The controller 16 can alternatively comprise a simple trigger that acts in response to a signal received from from a sensor, the trigger causing the valve 850 to move to the FO position. In this embodiment as in all previously described embodiments, the pin is moved continuously upstream at all times between the gate closed position and the position at which valve 850 is switched from the PO position to the FO positions. And the pin is also moved continuously upstream at the maximum velocity at which the drive system is capable of driving the actuators when the valves 850 are in the FO position. Such control systems are described in greater detail in for example U.S. Patent Publication no. 20090061034 the disclosure of which is incorporated herein by reference.

What is claimed is:

1. An apparatus for controlling the rate of flow of fluid mold material from an injection molding machine to a mold cavity, the apparatus comprising:
    a manifold receiving the injected fluid mold material, the manifold having a delivery channel that delivers the injected fluid material to a first gate leading to the mold cavity;
    an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin,
    the actuator and the valve pin being translationally driven at a controllable rate of travel by a valve system that is controllably adjustable between a start position, one or more intermediate drive rate positions and a high drive rate position, the actuator being driven upstream at one or more intermediate rates of travel when the valve system is in the one or more intermediate drive rate positions and at a higher rate of travel than the one or more intermediate rates of travel when the valve system is in the high drive rate position;
    the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve;
    a controller,
    the controller instructing the valve system to drive the actuator and the valve pin continuously upstream from the start position to the second position to the third position;
    the controller including instructions that instruct the second valve to move from the second position to the first position on receipt by the controller of a signal that is indicative of the valve pin having reached the second position or an elapse of a predetermined amount of time.

2. A method of performing an injection molding cycle in an injection molding apparatus comprising:
    a manifold that receives an injection fluid mold material, the manifold having a delivery channel that delivers the injection fluid mold material under an injection pressure to a first gate of a mold cavity,
    an actuator drivably interconnected to a valve pin having a tip end drivable along a drive path that extends between a first position where the tip end of the valve pin obstructs the gate to prevent the injection fluid material from flowing into the cavity, a second position upstream of the first position wherein the tip end of the valve pin restricts flow of the injection fluid along at least a portion of the length of the drive path extending between the first position and the second position, and a third position upstream of the second position where the injection fluid material flows freely without restriction from the tip end of the pin through the first gate, the actuator being driven by a valve system that is controllably adjustable between a start position, one or more intermediate drive rate positions and a high drive rate position, the actuator being driven upstream at one or more corresponding intermediate rates of travel when the valve system is in the one or more intermediate drive rate positions and at a higher rate of travel than the one or more intermediate rates of travel when the valve system is in the high drive rate position, the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve;

the method comprising:

selecting a predetermined amount of initial withdrawal time;

beginning an injection cycle with the tip end of the valve pin in the first position and the valve system in the start position, adjusting the valve system to operate at the one or more selected intermediate drive rate positions to drive the tip end of the valve pin continuously upstream from the first position to the second position, adjusting the second valve to move from the first to the second position to cause the valve system to operate at the high drive rate position to drive the tip end of the valve pin continuously upstream at the higher rate of travel when the predetermined amount of initial withdrawal time has elapsed.

3. A method of performing an injection molding cycle in an injection molding apparatus comprising:

a manifold that receives an injection fluid mold material, the manifold having a delivery channel that delivers the injection fluid mold material under an injection pressure to a first gate of a mold cavity, an actuator drivably interconnected to a valve pin having a tip end drivable along a drive path that extends between a first position where the tip end of the valve pin obstructs the gate to prevent the injection fluid material from flowing into the cavity, a second position upstream of the first position wherein the tip end of the valve pin restricts flow of the injection fluid along at least a portion of the length of the drive path extending between the first position and the second position, and a third position upstream of the second position where the injection fluid material flows freely without restriction from the tip end of the pin through the first gate, the actuator being driven by a valve system that is controllably adjustable between a start position, one or more intermediate drive rate positions and a high drive rate position, the actuator being driven upstream at one or more corresponding intermediate rates of travel when the valve system is in the one or more intermediate drive rate positions and at a higher rate of travel than the one or more intermediate rates of travel when the valve system is in the high drive rate position, the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve;

the method comprising:

selecting the length of travel between the first position and the second position of the actuator, beginning an injection cycle with the tip end of the valve pin in the first position and the valve system in the start position, adjusting the valve system to operate at the one or more selected intermediate drive rate positions to drive the tip end of the valve pin continuously upstream from the first position to the second position, sensing the position of the valve pin to determine when the tip end of the valve pin has reached the second position, adjusting the second valve to move from the first to the second position to cause the valve system to operate at the high drive rate position to drive the tip end of the valve pin continuously upstream at the higher rate of travel when the tip end of the valve pin has been determined in the step of sensing to have reached the second position.

4. The method of claim 3 wherein the step of adjusting the valve system to operate at the one or more selected intermediate drive rate positions is begun after the injection fluid mold material has been previously injected into the cavity through another gate and the fluid mold material has travelled through the cavity past the first gate.

5. The method of claim 3 wherein the step of adjusting the valve system to operate at the one or more selected intermediate drive rate positions comprises adjusting the first valve to operate at a single intermediate drive rate position.

6. The method of claim 3 wherein the high drive rate position of the valve system drives the actuator at a rate of travel that is a maximum at which the valve system is capable of driving the actuator.

7. The method of claim 3 wherein the length of travel between the first position and the second position of the actuator along the drive path is selected to be between about 1 mm and about 5 mm.

8. The method of claim 3 wherein the step of sensing includes sensing the position of the valve pin with a position sensor that automatically sends one or more signals indicative of the position of the tip end of the valve pin to a control mechanism that automatically adjusts the position of the second valve in response to receipt of the one or more signals from the position sensor.

9. The method of claim 3 wherein the tip end of the valve pin restricts flow of the injection fluid along the entire length of the drive path extending between the first position and the second position.

10. An apparatus for controlling the rate of flow of fluid mold material from an injection molding machine to a mold cavity, the apparatus comprising:
 a manifold receiving the injected fluid mold material, the manifold having a delivery channel that delivers the injected fluid material to a first gate leading to the mold cavity; an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin,
 the actuator and the valve pin being translationally driven at a controllable rate of travel by a valve system that is controllably adjustable between a start position, one or more intermediate drive rate positions and a high drive rate position, the actuator being driven upstream at one or more intermediate rates of travel when the valve system is in the one or more intermediate drive rate positions and at a higher rate of travel than the one or more intermediate rates of travel when the valve system is in the high drive rate position; the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve;
a position sensor and a controller,
 the position sensor sensing the position of the valve pin and sending a signal indicative of the position of the pin to the controller;
 the controller instructing the valve system to drive the actuator and the valve pin continuously upstream from the start position to the second position to the third position;
 the controller including instructions that instruct the second valve to move from the second position to the first position on receipt by the controller of a signal from the position sensor that is indicative of the valve pin having reached the second position.

11. The apparatus of claim 10 further comprising an electrical signal generating device interconnected to the first valve to controllably adjust the first valve to a selected degree of openness, the electrical signal generating device generating an electrical signal of controllably variable degree of output, the first valve being adjustable in degree of openness that is approximately proportional to the degree of output of the electrical signal.

12. The apparatus of claim 10 wherein the portion of the drive path over which the flow of injected material is restricted is at least about 30% of the length of the drive path between the first position and the second position.

13. The apparatus of claim 10 wherein the length of the drive path between the first position and the second position is between about 1 mm and about 5 mm.

14. The apparatus of claim 10 wherein the valve pin and actuator are driven at a maximum rate of upstream travel that the valve system is capable of driving the actuator at when the valve system is in the high drive rate position.

15. The apparatus of claim 10 wherein the rate of travel of the valve pin corresponding to the highest of the one or more intermediate drive positions of the valve system is less than about 75% of the rate of travel of the valve pin corresponding to the high drive position.

16. An apparatus for controlling the rate of flow of fluid mold material from an injection molding machine to a mold cavity, the apparatus comprising:
 a manifold receiving the injected fluid mold material, the manifold having a delivery channel that delivers the injected fluid material to a first gate leading to the mold cavity;
 an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin,
 the actuator and the valve pin being translationally driven at a controllable rate of travel by a valve system that is controllably adjustable between a start position, one or more intermediate drive rate positions and a high drive rate position, the actuator being driven upstream at one or more intermediate rates of travel when the valve system is in the one or more intermediate drive rate positions and at a higher rate of travel than the one or more intermediate rates of travel when the valve system is in the high drive rate position;
 the valve system comprising a source of valve drive fluid that pumps the drive fluid at a maximum drive rate, a first valve interconnected to the source that is selectively adjustable to adjust rate of flow of the drive fluid from the source to a selected less than maximum drive rate and a second valve controllably movable between a first position where the second valve is directly interconnected to the source and a second position where the second valve is interconnected to the first valve, the second valve enabling maximum flow of drive fluid received from either the source or the first valve;
a controller including a timer,
 the timer including a memory containing a preselected period of time over which the first valve is interconnected to the source and the second valve is in the second position;
 the controller instructing the valve system to drive the actuator and the valve pin continuously upstream from the start position to the second position to the third position;
 the controller including instructions that instruct the second valve to move from the second position to the first position on receipt by the controller of a signal from the controller that the timer has determined that the preselected period of time has elapsed since the start of the injection cycle.

17. A method of performing an injection molding cycle in an apparatus according to claim 1, the method comprising injecting the fluid mold material from the injection molding machine into and through the manifold into the mold cavity and forming a part in the mold cavity from the injected fluid mold material.

18. A method of performing an injection molding cycle in an apparatus according to claim 10, the method comprising injecting the fluid mold material from the injection molding machine into and through the manifold into the mold cavity and forming a part in the mold cavity from the injected fluid mold material.

19. A method of performing an injection molding cycle in an apparatus according to claim 16, the method comprising injecting the fluid mold material from the injection molding machine into and through the manifold into the mold cavity and forming a part in the mold cavity from the injected fluid mold material.

\* \* \* \* \*